(12) United States Patent
Li

(10) Patent No.: US 8,926,113 B2
(45) Date of Patent: Jan. 6, 2015

(54) DISPLAY DEVICE AND BACKLIGHT MODULE

(75) Inventor: Quan Li, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 257 days.

(21) Appl. No.: 13/510,610

(22) PCT Filed: Apr. 12, 2012

(86) PCT No.: PCT/CN2012/073874
§ 371 (c)(1),
(2), (4) Date: May 17, 2012

(87) PCT Pub. No.: WO2013/143174
PCT Pub. Date: Oct. 3, 2013

(65) Prior Publication Data
US 2013/0258703 A1    Oct. 3, 2013

(51) Int. Cl.
*G09F 13/04* (2006.01)
*G09F 13/08* (2006.01)

(52) U.S. Cl.
USPC .......... 362/97.1; 362/606; 362/632; 362/633; 362/609; 349/58; 349/62; 349/65

(58) Field of Classification Search
CPC ....... F21V 17/02; F21V 23/06; G02B 6/0091; G02B 6/009; G02F 1/133602; F21S 2/00
USPC .......... 362/606, 633, 632, 97.1, 609; 349/58, 349/62, 65
See application file for complete search history.

(56) References Cited

U.S. PATENT DOCUMENTS

| | | | |
|---|---|---|---|
| 7,236,215 B2 * | 6/2007 | Okamoto et al. | 349/58 |
| 2004/0085491 A1 * | 5/2004 | Ogawa et al. | 349/58 |
| 2010/0066937 A1 * | 3/2010 | Yamashita et al. | 349/58 |
| 2011/0128463 A1 * | 6/2011 | Ji et al. | 349/58 |
| 2012/0092890 A1 * | 4/2012 | Matsui | 362/607 |
| 2012/0293729 A1 * | 11/2012 | Yoshikawa | 348/739 |

* cited by examiner

*Primary Examiner* — Anh Mai
*Assistant Examiner* — Kevin Quarterman
(74) *Attorney, Agent, or Firm* — Andrew C. Cheng

(57) ABSTRACT

The present invention discloses a display device and a backlight module. The backlight module comprises a waveguide, a reflector, a backframe and a shimming device. The reflector arranged behind the waveguide. The backframe carries and supports the waveguide and the reflector. An light inlet edge of the waveguide and the backframe is defined with a gap in which a shimming device is seated within the gap so as to effectively support the waveguide. This arrangement can effectively prevent the warpage or bending of the waveguide in the area of the light inlet area. Stabilizing the efficiency of illumination of the backlight module. As a result, the insufficient of illumination of the waveguide encountered by the prior art is avoided.

16 Claims, 3 Drawing Sheets

DISPLAY DEVICE AND BACKLIGHT MODULE

FIELD OF THE INVENTION

The present invention relates to a technology of display device, and more particularly to a displaying device and its backlight module.

BACKGROUND OF THE INVENTION

In the field of edge-type backlight module powered by LED, in order to make the backlight module slim and compact, the waveguide has become thinner and thinner. Currently, the thickness of the waveguide has reached to 2.00 mm. It is estimated that a waveguide of thickness of 1.5 mm or even 1.0 mm is expected in near future. According to the field requirements, the frame used to support and carries the waveguide will be distant to the waveguide in an area adjacent to the inlet of the light source. As a result, the waveguide will not be properly supported at the area adjacent to its inlet area. This arrangement will create a gap between the inlet of the waveguide and the frame. As the waveguide becomes thinner and thinner, the rigidity of the waveguide itself reduces as well. Accordingly, the waveguide tends to warp or bent easily. This warpage and bending will make the flareness of the waveguide become poor, creating an insufficient of illumination of the waveguide.

SUMMARY OF THE INVENTION

It is a main objective of the present invention is to provide a display device and its backlight module in which a waveguide of the backlight module can be readily prevented from warpage or bending. Accordingly, it flareness and illumination efficiency will be upgraded and enhanced.

In order to resolve the issues encountered by the existing art, a backlight module is provided and it comprises a waveguide, a reflector, a backframe and a shimming device. The reflector arranged behind the waveguide. The backframe carries and supports the waveguide and the reflector. An light inlet edge of the waveguide and the backframe is defined with a gap in which a shimming device is seated within the gap so as to effectively support the waveguide.

Wherein the shimming device is a supporting post and the backframe is defined with through hole, and a first end of the supporting post rested onto the reflector after passing through the hole, and the second end is landed on the backframe.

Wherein the second end of the supporting post is an elastic, and the second end is secured onto an outer wall of the backframe so as to create an elastic engagement between the supporting post and the backframe.

Wherein the second end of the supporting post is secured to the backframe by a screw member or a connecting pin.

Wherein the shimming device is a supporting wedge with its upper end leaning against to the reflector, and its lower end rests onto an inner wall of the backframe.

Wherein the upper end of the supporting wedge is defined with a recess defined with a first threaded hole passing through the upper end and the lower end of the supporting edge, the backframe is defined with a second threaded hole in aligning with the first threaded hole, the backlight module further includes a screw interconnecting the first and second threaded holes so as to securely attach the supporting wedge to the backframe.

Wherein the supporting wedge is provided with elastic embossment extending from the recess toward the waveguide.

Wherein the waveguide and the reflector are defined with recess with respect to the elastic embossment of the supporting wedge, the backlight module is provided optic film disposed on top of the waveguide which is defined with openings corresponding to the elastic embossment, a top of the elastic embossment passing through the opening and engaged with a surface of the optic film.

Wherein the top of the elastic embossment is configured as an elastic hook or a mushroom buckle.

In order to resolve the issues encountered by the existing art, the present invention provides a second solution by providing a display panel configured with a backlight module is provided and it comprises a waveguide, a reflector, a backframe and a shimming device. The reflector arranged behind the waveguide. The backframe carries and supports the waveguide and the reflector. An light inlet edge of the waveguide and the backframe is defined with a gap in which a shimming device is seated within the gap so as to effectively support the waveguide.

Wherein the shimming device is a supporting post and the backframe is defined with through hole, and a first end of the supporting post rested onto the reflector after passing through the hole, and the second end is landed on the backframe.

Wherein the second end of the supporting post is an elastic, and the second end is secured onto an outer wall of the backframe so as to create an elastic engagement between the supporting post and the backframe.

Wherein the second end of the supporting post is secured to the backframe by a screw member or a connecting pin.

Wherein the shimming device is a supporting wedge with its upper end leaning against to the reflector, and its lower end rests onto an inner wall of the backframe.

Wherein the upper end of the supporting wedge is defined with a recess defined with a first threaded hole passing through the upper end and the lower end of the supporting edge, the backframe is defined with a second threaded hole in aligning with the first threaded hole, the backlight module further includes a screw interconnecting the first and second threaded holes so as to securely attach the supporting wedge to the backframe.

Wherein the supporting wedge is provided with elastic embossment extending from the recess toward the waveguide.

Wherein the waveguide and the reflector are defined with recess with respect to the elastic embossment of the supporting wedge, the backlight module is provided optic film disposed on top of the waveguide which is defined with openings corresponding to the elastic embossment, a top of the elastic embossment passing through the opening and engaged with a surface of the optic film.

Wherein the top of the elastic embossment is configured as an elastic hook or a mushroom buckle.

The advantages of the present invention is that as compared to the existing prior art, the display device and the backlight module can effectively prevent the warpage or bending of the waveguide in the area of the light inlet area. Stabilizing the efficiency of illumination of the backlight module. As a result, the insufficient of illumination of the waveguide encountered by the prior art is avoided.

DETAILED EMBODIMENT OF PREFERRED EMBODIMENT

Figure 1:
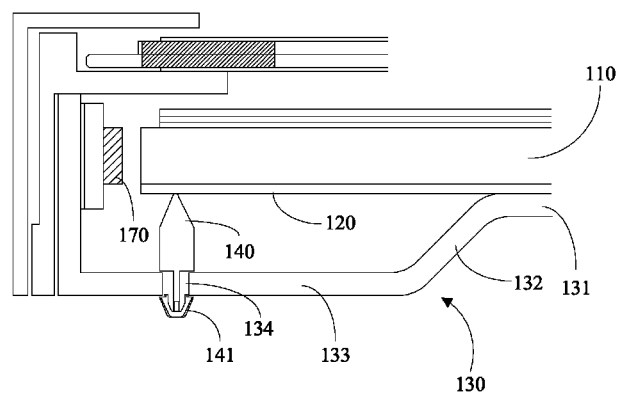
FIG. 1 is an illustrational view of a backlight module made in accordance with a first embodiment of the present invention.

Referring to FIG. 1, a first embodiment of a backlight module is provided. The backlight module comprises a waveguide 110, a reflector 120, a backframe 130, a shimming device 140 and a slight source 170.

The reflector 120 arranged behind the waveguide 110. The backframe 130 carries and supports the waveguide 110 and the reflector 120. The supporting frame 130 includes a carrier 131, a curve portion 132 and a recess 133. The carrier 131 holds firmly the waveguide 110 and the reflector 120. In the curve area 132 of the waveguide 110 adjacent to the light source 170, an extension is formed and extends away from the waveguide 110. After a preset distance, the extension is in parallel to the carrier 131 and therefore defines a recess 133. As a result, the waveguide 110 and the backframe 130 is defined with a gap adjacent to the light source 170 in an area of light inlet area. The shimming device 140 is disposed within the gap so as to effectively support the waveguide 110 and the reflector 120. In this preferred embodiment, a top of the shimming device 140 and the carrying surface of the carrier 131 are coplanar.

In the present embodiment, the shimming device 140 has a columnar configuration, i.e. in the form of a supporting post 140. The recess 133 of the backframe 130 is defined with through hole 134. The first end of the supporting post 140 passes through the through hole 134 and lands onto the reflector 120. The second end of the supporting post 140 is secured to the backframe 130. As seen from FIG. 1, the cross section of the supporting post 140 is larger then the diameter of the through hole 134. The second end of the supporting post 140 is an elastic portion 141 and which is secured to an outer wall of the backframe 130 such that the supporting post 140 is securely engaged to the backframe 130. When the supporting post 140 is installed, the elastic portion 141 is pushed outwardly through the through hole 134 of the backframe 130. In this case, the elastic portion 141 will be deformed to as to get therethrough. After the elastic portion 141 passes through, it resumes to its original diameter. As a result, the supporting post 140 and the backframe 130 are securely engaged. The tip of the elastic portion 141 is a hook. In other embodiments, the elastic portion 141 can be a mushroom buckle. It is understandable, the second end of the supporting post 140 can be securely attached to the backframe 130 by means of screw or connecting pin. The supporting post 140 can be made from plastic, rubber, silica gel and metal with a certain flexibility without easily damaged.

Figure 2:
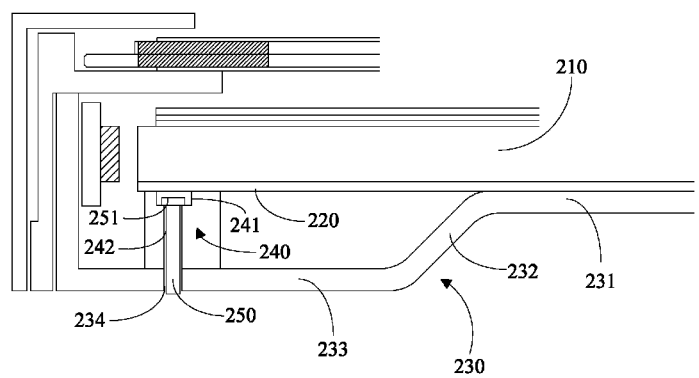
FIG. 2 is an illustrational view of a backlight module made in accordance with a second embodiment of the present invention.

Referring to FIG. 2, an illustrational view of a second embodiment of the backlight module. According to the second embodiment, the backlight module includes a waveguide 210, a reflector 220, a backframe 230, and a shimming device 240.

Difference between the first and second embodiments is that the shimming device 240 is a supporting wedge 240. The upper end of the supporting wedge 240 leans against the reflector 220, and the lower end lands onto an inner wall of the backframe 230. The upper end of the supporting wedge 240 is defined with a recess 241 in which a first threaded hole 242 connecting the upper and lower ends of the supporting wedge 240 is defined. The backframe 230 is defined with a second threaded hole 234 in aligned with the first threaded hole 242. The backlight module further includes a screw 250 interconnecting the first and second threaded holes 242, 234 so as to securely attach the supporting wedge 240 onto the backframe 230. The head 251 of the screw 250 is located within the recess 241 and is distant to the reflector 220. The length of the screw 250 is longer than the first threaded hole 242 while is shorter than the total length of the first and second threaded holes 242 and 234. In the other embodiment, a rivet can be applied that the rivet can passes through the first threaded hole 242, and then anchored in the second threaded hole 234. Other elastic device, such as an elastic post bridged between the first and second threaded holes 242 and 234. The supporting wedge 240 can be made from plastic, rubber, silica gel and metal.

Similarly, the backframe 230 includes a carrier 231, a curve portion 232 and a recess 233. A top surface of the supporting wedge 240 is coplanar to the carrying surface of the carrier 231.

Figure 3:
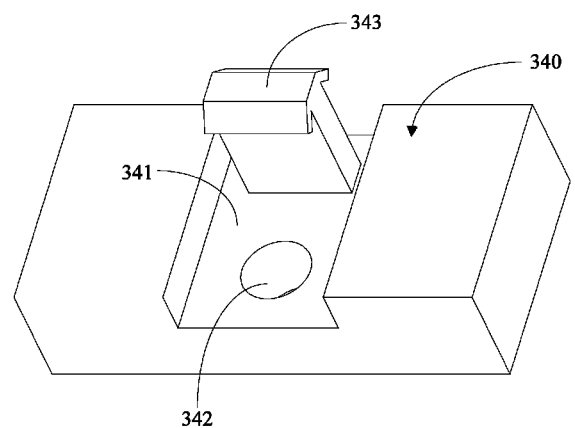
FIG. 3 is a perspective view of a supporting member of a backlight module made in accordance with a third embodiment of the present invention.

Referring to FIG. 3, a perspective view of a shimming device made in accordance to a third embodiment of the present invention. The difference between the second and third embodiment is that the supporting wedge 340 is additionally provided with an elastic embossment 343 other than a recess 341, and a first threaded hole 342.

Figure 4:
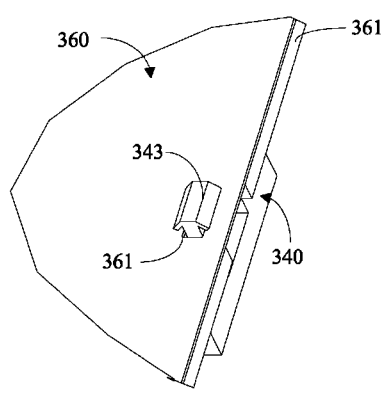
FIG. 4 is a partial perspective view of a backlight module made in accordance with the third embodiment of the present invention.
Figure 5:
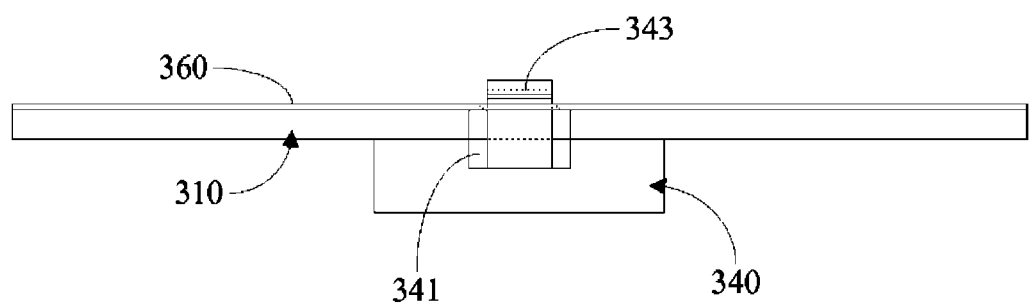
FIG. 5 is a side elevational view of a backlight module made in accordance with the third embodiment of the present invention.

FIG. 4 is a partial perspective view of the backlight module of the third embodiment in accordance with the present invention. FIG. 5 is a side elevational view of the backlight module of the third embodiment. Referring to FIGS. 4 and 5, the backlight module further includes an optic film 360 disposed above the waveguide 310. The elastic embossment 343 extends toward the waveguide 343 form a surface of the recess 341. The waveguide 310 and the reflector (not shown in this Figure) is defined with recess 341 corresponding to the elastic embossment 343. The optic film 360 is defined with opening 361 corresponding to the elastic embossment 343. Accordingly, the elastic embossment 343 can passes through the recess 341. With the external force applied, the elastic embossment 343 can be pushed through the opening 361 after it is squeezed. After the external force is released, the elastic embossment 343 will resume to its original shape. Accordingly, the top of the elastic embossment 343 will project out of the opening 361 and engages with the surface of the optic film 360 so as to securely position the optic film 360. By this securement, even the whole is hanged over the wall, the optic film 360 will not be disengaged from its position as external force applied.

A top of the elastic embossment 343 is configured with an elastic hook. In other embodiment, it can also embodied as a mushroom buckle. It is understandable, the supporting wedge 340 can be made from plastic, rubber, silica gel and metal with a certain flexibility without easily damaged.

In the other alternatives of the embodiment, the screw used in above embodiment is omitted. In this case, the supporting wedge is securely attached to the optic films and the waveguide. No need to define openings on the backframe as well.

The present invention further provides a display device incorporated with a display panel and a backlight module supplying the light source of the display panel. The backlight module what disclosed and described above.

As distinguished from the existing technology, the display device and backlight module incorporates with a shimming device seated into a gap located between the inlet of the waveguide adjacent to the light source and the backframe to properly support and carry the waveguide and the reflector. This arrangement can effectively prevent the warpage or bending of the waveguide in the area of the light inlet area. Stabilizing the efficiency of illumination of the backlight module. As a result, the insufficient of illumination of the waveguide encountered by the prior art is avoided.

The above described is merely preferred embodiment of the present invention, and it is merely for illustration while not for limitation. As a result, any alternation and modification or any equivalents based on the specification as well as the drawings will be covered by the attached claims even they are applied to other fields of technology directly or indirectly.

The invention claimed is:

1. A backlight module, comprising:
   a waveguide;
   a reflector arranged behind the waveguide;
   a backframe carrying the waveguide and the reflector, a light inlet edge of the waveguide and the backframe being provided with a gap; and
   a shimming device configured in a supporting post and disposed within the gap so as to effectively support the waveguide, wherein the backframe is defined with a through hole, and a first end of the supporting post is in touch with a bottom surface of the reflector after passing through the hole, and the second end is landed on the backframe.

2. The backlight module as recited in claim 1, wherein the second end of the supporting post is an elastic, and the second end is secured onto an outer wall of the backframe so as to create an elastic engagement between the supporting post and the backframe.

3. The backlight module as recited in claim 1, wherein the second end of the supporting post is secured to the backframe by a screw member or a connecting pin.

4. The backlight module as recited in claim 1, wherein the shimming device is a supporting post is embodied into wedge-shaped configuration and with its upper end leaning against to the reflector, and its lower end rests onto an inner wall of the backframe.

5. The backlight module as recited in claim 4, wherein the upper end of the supporting post is defined with a recess defined with a first threaded hole passing through the upper end and the lower end of the supporting edge, the backframe is defined with a second threaded hole in aligning with the first threaded hole, the backlight module further includes a screw interconnecting the first and second threaded holes so as to securely attach the supporting post to the backframe.

6. The backlight module as recited in claim 5, wherein the supporting post is embodied into wedge-shaped configuration and is provided with an elastic embossment extending from the recess toward the waveguide.

7. The backlight module as recited in claim 6, wherein the waveguide and the reflector are defined with a recess with respect to the elastic embossment of the supporting post, the backlight module is provided an optic film disposed on top of the waveguide which is defined with openings corresponding to the elastic embossment, a top of the elastic embossment passing through the opening and engaged with a surface of the optic film.

8. The backlight module as recited in claim 7, wherein the top of the elastic embossment is configured as an elastic hook or a mushroom buckle.

9. A display device configured with a display panel and a backlight module which illuminates the display panel with its light source, the backlight module comprising:
   a waveguide;
   a reflector arranged behind the waveguide;
   a backframe carrying the waveguide and the reflector, a light inlet edge of the waveguide and the backframe being provided with a gap; and
   a shimming device configured in a supporting post and disposed within the gap so as to effectively support the waveguide, wherein the backframe is defined with a through hole, and a first end of the supporting post is in touch with a bottom surface of the reflector after passing through the hole, and the second end is landed on the backframe.

10. The display device as recited in claim 9, wherein the second end of the supporting post is an elastic, and the second end is secured onto an outer wall of the backframe so as to create an elastic engagement between the supporting post and the backframe.

11. The display device as recited in claim 9, wherein the second end of the supporting post is secured to the backframe by a screw member or a connecting pin.

12. The display device as recited in claim 9, wherein the shimming device is a supporting post is embodied into wedge-shaped configuration and with its upper end leaning against to the reflector and its lower end rests onto an inner wall of the backframe.

13. The display device as recited in claim 12, wherein the upper end of the supporting post is defined with a recess defined with a first threaded hole passing through the upper end and the lower end of the supporting post, the backframe is defined with a second threaded hole in aligning with the first threaded hole, the backlight module further includes a screw interconnecting the first and second threaded holes so as to securely attach the supporting post to the backframe.

14. The display device as recited in claim 13, wherein the supporting post is provided with an elastic embossment extending from the recess toward the waveguide.

15. The display device as recited in claim 14, wherein the waveguide and the reflector are defined with a recess with respect to the elastic embossment of the supporting post, the backlight module is provided an optic film disposed on top of the waveguide which is defined with openings corresponding to the elastic embossment, a top of the elastic embossment passing through the opening and engaged with a surface of the optic film.

16. The display device as recited in claim 15, wherein the top of the elastic embossment is configured as an elastic hook or a mushroom buckle.

* * * * *